United States Patent [19]

Tingskog

[11] Patent Number: 5,400,899
[45] Date of Patent: Mar. 28, 1995

[54] BELT CONVEYOR AND CONVEYOR BELT THEREFOR

[76] Inventor: Lennart Tingskog, Kattegattsgatan 23, SE-71 Helsingborg, Sweden

[21] Appl. No.: 211,630
[22] PCT Filed: Oct. 22, 1991
[86] PCT No.: PCT/SE92/00733
    § 371 Date: Jun. 20, 1994
    § 102(e) Date: Jun. 20, 1994
[87] PCT Pub. No.: WO93/08106
    PCT Pub. Date: Apr. 29, 1993

[30] Foreign Application Priority Data

Oct. 22, 1991 [SE] Sweden ................. 9103078

[51] Int. Cl.⁶ .................................. B65G 15/08
[52] U.S. Cl. ........................................ 198/819
[58] Field of Search ............................ 198/819

[56] References Cited

U.S. PATENT DOCUMENTS 4,823,941  4/1989  Mindich .
5,060,787  10/1991 Tingskog ............... 198/819
5,107,983  4/1992  Tschantz ............... 198/819

FOREIGN PATENT DOCUMENTS 0058040  8/1982  European Pat. Off. .
0371180  6/1990  European Pat. Off. .

Primary Examiner—Joseph E. Valenza

[57] ABSTRACT

A belt conveyor comprises an endless conveyor belt (4) of the type surrounding the material conveyed and having a central part (5) and two edge parts (6, 7) connected thereto. The edge parts are substantially flexurally rigid in the transverse direction of the belt. The belt conveyor further comprises a frame having support rollers for carrying the belt along at least part of its path. The one edge part (6) of the belt (4) is divided into two portions closest to its free longitudinal edge so as to form a longitudinal pocket open towards the free longitudinal edge. The free edge portion of the other edge part (7) is received in the pocket so as to be substantially unable to rotate therein, and is forcedly retained owing to the connection of the edge parts to the central part. A rotary disc (15), tapering in the form of a wedge towards its periphery, is mounted in the frame so as to engage and widen the pocket to enable the introduction of the free edge portion of the other edge part (7) therein at a belt sealing location along the belt path.

12 Claims, 3 Drawing Sheets

BELT CONVEYOR AND CONVEYOR BELT THEREFOR

The present invention relates to an endless conveyor belt of the type surrounding the material conveyed and comprising a planar central part which is flexurally rigid in the transverse direction of the belt, as well as two planar edge parts which are hingedly connected to the central part and are flexurally rigid in the transverse direction of the belt.

The invention also concerns a belt conveyor using such a conveyor belt and comprising a frame having support rollers for carrying the belt along at least part of its path.

Such conveyor belts are described in e.g. WO-A1-89/05765 and WO-A1-92/12076, incorporated herein by reference. In these prior-art conveyor belts, the central part is planar and flexurally rigid in the transverse direction of the belt and has low extensibility in the longitudinal direction of the belt. Further, the edge parts are planar and are each hingedly connected to a lateral edge of the central part as well as extendible in the longitudinal direction of the belt. The total width of the edge parts is at least equal to the width of the central part. Finally, two hinge parts are provided each for connecting one of the edge parts to the central part. The hinge parts are flexible in the transverse direction of the belt, extendible in the longitudinal direction of the belt, and resilient so as to pivot the edge parts outwards away from a position in which they are folded over the central part. The hinge parts have a width substantially smaller than that of the central part.

A belt conveyor using such a conveyor belt has several important advantages. It is, for instance, compact, simple, and inexpensive. It also permits sealed conveyance, can be arranged in bends of small radius, entails no spillage of material along the return path, and can be arranged along inclining or even vertical paths.

For certain materials, the conveyor belts described above may, however, suffer from sealing problems at the overlapping area of the edge parts. WO-A1-92/12076, mentioned above, discloses a solution to these problems.

Another inconvenience of prior-art belt conveyors is that they usually require a large number of pressure rollers or the like to achieve the desired sealing effect.

In other types of endless conveyor belts, sealing is achieved by designing one conveyor-belt edge as a hook and providing the other conveyor-belt edge with a slot of a cross-sectional shape corresponding to the shape of the hook. Thus, the conveyor-belt edges can be interlocked in a form-fitting manner. It is, however, quite complicated to introduce the hook into the slot and release it therefrom. Also, the material conveyed may enter and get stuck in the slot, thereby impeding the insertion of the hook into the slot and the aimed-at form-fitting locking action. EP-A1-0 371 180, for instance, discloses a conveyor belt of this type.

U.S. Pat. No. 4,823,941 discloses non-form-fitting joining of the edge portions of a conveyor belt. The belt described in this specification is tube-shaped, i.e. of circular cross-section, and requires extensive reinforcement to enable viable interlocking of the belt edges. However, the belt edges cannot be interlocked in a reliable manner in this conveyor belt.

A first object of the present invention is, therefore, to provide a conveyor belt of the type stated by way of introduction, which enables an improved sealing action without form-fitting interlocking of the belt edges, at the same time as it does not require a large number of rollers for upholding the sealing action.

A second object of the invention is to provide a belt conveyor which is of the type stated by way of introduction and which uses a conveyor belt according to the invention while enabling simple closure or sealing thereof.

According to the invention, the first object is achieved by a conveyor belt which is of the type stated by way of introduction and which is characterised in that the one planar edge part is divided into two portions closest to its free longitudinal edge so as to form a longitudinal flat pocket which is open towards the free longitudinal edge and whose depth is substantially larger than its width, that the free edge portion of the other planar edge part is received in the pocket so as to be substantially unable to rotate about the longitudinal axis of the belt owing to its thickness being substantially the same as the width of the pocket and owing to the total width of the two planar edge parts being substantially larger than the width of the central part, and that the free edge portion of said other planar edge part is forcedly retained in the pocket as a result of the hinge connection between the planar central part and the two planar edge parts which, like the central part, act in the manner of a single, substantially rigid plate.

By this solution, the two edge parts will be forcedly held together and, owing to the design of the pocket, will behave, like the central part, substantially as a single piece which is substantially flexurally rigid in the transverse direction of the belt, and this without any form-fitting locking action.

By "flat pocket" is here preferably meant a pocket whose width, after receiving the free edge portion, is substantially the same over the entire depth of the pocket or decreases towards the bottom thereof, thereby avoiding form-fitting interlocking. However, the pocket is suitably extendible at its open side to facilitate the reception of the free edge portion of said other edge part.

To enable the introduction of the free edge portion of said other edge part into the pocket, the latter is suitably delimited by two flaps, of which one is flexurally rigid in the transverse direction of the belt while the other, although having a certain flexural rigidity, can be bent outwards away from the flexurally rigid flap.

Advantageously, the flexurally rigid flap extends farther than the flexible one, since this facilitates the positioning of the free edge portion of said other edge part when to be introduced into the pocket.

To further secure the non-rotatability mentioned above, the flexible flap may be pre-formed so as to give the empty pocket less width closest to its opening.

Advantageously, the pocket is defined by a U-shaped strip fixedly connected to the free edge portion of said one edge part. This yields a large surface for securely fixing the strip to the free edge portion, e.g. by vulcanisation of the surfaces of the strip and the free edge portion facing one another, when these are made of rubber.

The invention is especially applicable to conveyor belts of the type described in the above documents, i.e. a conveyor belt which is characterised in that the central part is planar and flexurally rigid in the transverse direction of the belt and has low extensibility in the longitudinal direction of the belt; that the edge parts are planar, each hingedly connected to a lateral edge of the central part and extendible in the longitudinal direction of the belt and have a total width larger than the width of the central part; and that two hinge parts are each provided for connecting one edge part and the central part, said hinge parts being flexible in the transverse direction of the belt, extendible in the longitudinal direction of the belt and resilient so as to permit pivoting the edge parts outwards away from a position in which they are folded over the central part, and further having a substantially smaller width than the central part. The invention is also applicable to such a belt, in which the free edge portion of said other edge part received in the pocket is hingedly connected to the remainder of the edge part. This variant does, however, require a larger number of pressure rollers to ensure that the free edge portion of said other edge part is retained in the pocket.

According to the invention, the second object is achieved by a belt conveyor which is of the type stated by way of introduction and which is characterised in that the one planar edge part is divided into two portions closest to its free longitudinal edge so as to form a longitudinal flat pocket which is open towards the free longitudinal edge and whose depth is substantially larger than its width, that the free edge portion of the other planar edge part is received in the pocket so as to be substantially unable to rotate about the longitudinal axis of the belt owing to its thickness being substantially the same as the width of the pocket and owing to the total width of the two planar edge parts being substantially larger than the width of the central part, and that a rotary disc is mounted in the frame to engage and widen the pocket to enable the introduction of the free edge portion of said other edge part therein at a belt sealing location along the belt path.

The free edge portion of said other edge part may thus be easily introduced into the pocket.

When the befit travels through bends, the two edge parts may tend to move away from one another. According to the invention, this inconvenience can be obviated in an inventive belt conveyor by the provision of means for preventing an increase in the belt width when the belt changes it direction of travel.

The invention considerably improves the degree of sealing. This can be used to achieve greater safety in inclined or vertical conveyance of materials involving sealing difficulties. The improved sealing degree also enables heavily inclined or vertical conveyance of fluidisable materials, such as cement, kaolin and aluminium oxide.

The invention further eliminates the need for sealing rollers keeping the one edge part pressed against the other. Only safety rollers may be needed, but these may then be placed at a considerable distance from one another. This also goes for the material-conveying run as well as the return run of the conveyor path. As a result of the drastic reduction of the number of rollers in a conveyor according to the invention, also the movable masses, the friction and, consequently, the force required for driving the belt are reduced.

By the invention, the belt can also travel with the belt opening facing downwards without any need for complicated roller systems.

The improved sealing degree is especially advantageous in those cases where the belt is rotated about its longitudinal axis along the belt path.

The solution provided by the invention may be combined with the type of sealing described in WO-A1-92/12076, and also be applied to a conveyor belt of the type described in Swedish Patent Application 9101158-5, where use is made of a separate carrier belt. In the latter case, when the conveyor is intended primarily for transporting goods over long distances, the reduction in the number of rollers and the simplified construction are of decisive importance.

The invention will be described in more detail below with the aid of exemplifying embodiments and with reference to the accompanying drawings, in which FIG. 1 is a cross-sectional view of a belt conveyor according to the invention and shows a first embodiment of a conveyor belt according to the invention;

Figure 1:
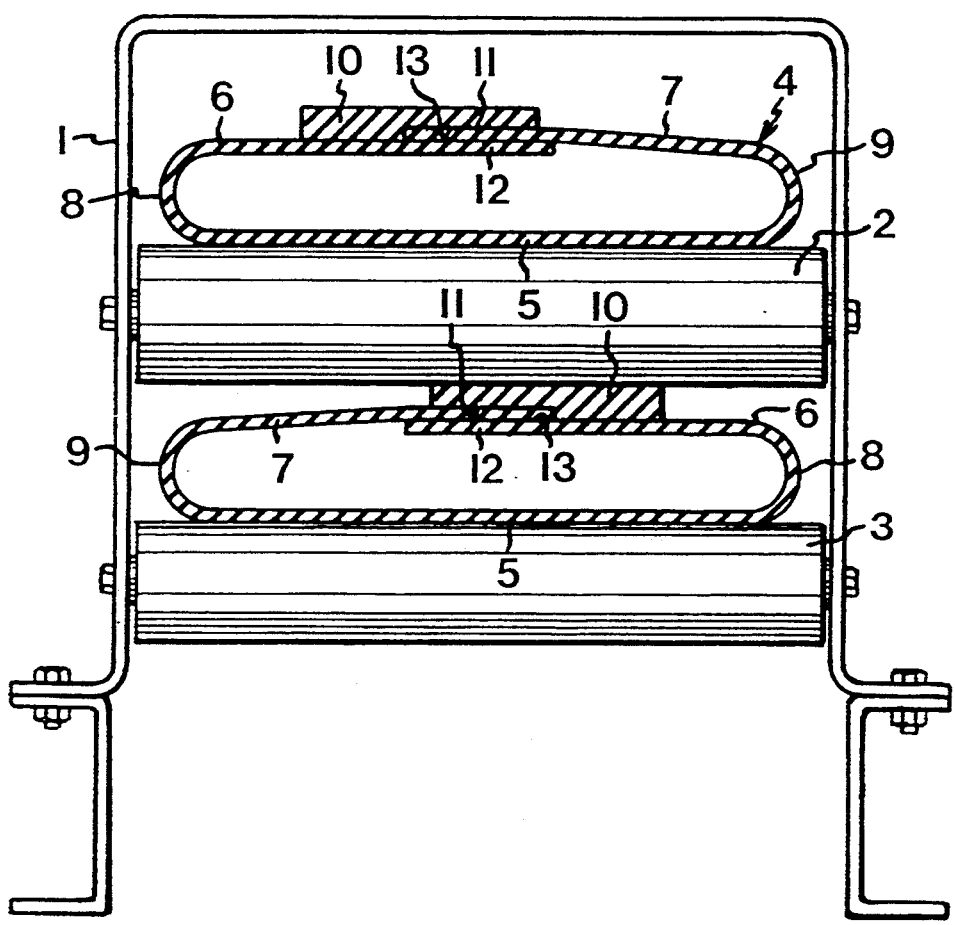

FIG. 1 illustrates an embodiment of a belt conveyor according to the invention. A frame 1, forming part of the frame structure of the belt conveyor, carries two rotary support rollers 2 and 3 which are mounted in the frame 1 and located one above the other. The rollers 2 and 3 support a conveyor belt 4 in its material-conveying run and its return run, respectively. The belt 4 consists of a central part 5, two edge parts 6, 7 and hinge parts 8, 9 serving to connect the edge parts 6, 7 to the central part 5. The belt 4 is made in one piece by vulcanisation of several superimposed layers of e.g. rubber, with different reinforcing layers provided therebetween.

A preferred design of the reinforcing layers is described in more detail in WO-A1-89/05765. Thus, a first reinforcing layer consists of transverse fibres or threads possessing considerable tensile strength and compressive strength, is unsymmetrically positioned in the belt 4 and extends across the entire width of the belt. A second transverse reinforcing layer consists of three parts, the extent of which corresponds to that of the central part 5, the edge part 6 and the edge part 7. This reinforcing layer is of the same type as the first reinforcing layer. A third reinforcing layer has the same extent as the central part 5 and is provided between the other two reinforcing layers. The third reinforcing layer comprises longitudinal fibres or threads of considerable tensile strength, and may also consist of conventional cord.

The fibres or threads in the reinforcing layers may consist of metal, e.g. steel; plastic, e.g. polyester or polyamide; or carbon fibres. Apart from rubber, the belt 4 itself can be made of plastic or a mixture of plastic and rubber.

The conveyor belt 4 according to the invention is preferably manufactured in a completely flat state, and is thus composed of a central part 5 and two edge parts 6, 7, all of which are transversely rigid, i.e. flexurally rigid in the transverse direction of the belt or about the longitudinal axis of the belt. Thus, the central part 5 and the edge parts 6, 7 will behave in the manner of substantially rigid plates which are hingedly connected to one another by the hinge parts 8 and 9. The very high flexural rigidity is due to the reinforcing layers which are spaced apart in the direction of thickness of the belt and possess considerable tensile strength and compressive strength in the transverse direction of the belt. Unlike the central part 5, the edge parts 6, 7 have good extensibility in the longitudinal direction of the belt, which also goes for the hinge parts 8 and 9. However, the hinge parts 8 and 9, which are flexible relative to the longitudinal axis of the belt, have a certain resilience, which is here achieved by the first reinforcing layer and which, when the edge parts 6, 7 are folded in over the central part 5, forces the edge parts 6, 7 to pivot outwards away from the central part 5. This outwardly-directed resilience is at least strong enough to keep the edge parts 6, 7 at a distance above the central part 5, but is preferably such that the edge parts 6, 7 are pivoted outwards to the same plane as the central part 5. Although the hinge parts 8 and 9 are thus to possess a given resilience or a certain flexural rigidity, this rigidity has to be much less than that of the central part 5 and the edge parts 6, 7, thereby to result in a defined connection.

As shown in FIG. 1, the total width of the edge parts 6, 7 is larger than the width of the central part 5, which results in overlapping of the outer portions of the edge parts 6, 7. Thus, the material conveyed will be enclosed to some extent.

According to the invention, the edge part 6 is provided, at its free longitudinal edge, with an external strip 10 extending throughout the entire length of the belt and being, over part of its width, fixedly connected to the edge part 6, e.g. by vulcanisation. The strip 10 is thinner closest to the free longitudinal edge of the edge part 6, whereby there is formed a longitudinal pocket 11 between the strip 10 and an outer or free edge portion 12 of the edge part 6. Conveniently, the strip 10 is made of the same material as the remainder of the belt 4 and is extendible in the longitudinal direction of the belt and comparatively flexurally rigid in the transverse direction of the belt. By the strip 10, the edge part 6 is thus divided into two portions at its free longitudinal edge so as to form the pocket 11, which is delimited by two flaps. One of these flaps is formed of the strip 10, while the other is formed of the free edge portion 12 of the edge part 6 extending outwardly of the strip 10.

When a free or outer edge portion 13 of the edge part 7 is received in the pocket 11, this and the edge portion 13 have substantially the same cross-sectional dimensions. This results in a non-rotatable connection between the edge parts 6 and 7. Further, the edge parts 6 and 7 are forcedly retained in the illustrated position by their connection to the central part 5, and it is of decisive importance that the edge parts 6, 7 are flexurally rigid in the transverse direction of the belt 4.

Once the edge parts 6 and 7 have come to occupy the position shown in FIG. 1, the invention provides secure locking thereof. Owing to the inventive connection, the edge parts 6 and 7 will, to be more specific, together behave approximately in the same way as the central part 5. Then, the conveyor belt 4 behaves as if it were completely closed and there were no joint between the edge parts 6 and 7. The stability of the closed or locked position of the belt 4 is basically due to the fact that the two rigid edge parts 6 and 7 have to move in parallel away from one another in the plane of the pocket 11 in order to come apart. Such a movement reduces the radius of curvature of the hinge parts 8, 9. Owing to the flexural rigidity or resilience of the hinge parts 8, 9, there arises a retaining force which rapidly increases to lock the edge parts 6 and 7 in the closed state. The retaining force increases at a higher rate than solely proportionally to the force striving to separate the edge parts. Thus, it is important that the flexural rigidity of the hinge parts 8, 9 is adapted to the inventive effect and that the depth of the pocket 11 is substantially larger than the width, e.g. at least 5 times as large, preferably at least 8 times as large.

In the embodiment of the inventive belt conveyor shown in FIG. 1, the upper belt run is used for conveying material. The pressure rollers required in prior-art belt arrangements of this type for maintaining the edge part 7 pressed against the edge part 6 can be dispensed with in this case. Safety rollers may be provided so as to be applied against the outside of the strip 10, but they can be spaced apart at a much greater distance than the support rollers 2. The support rollers 2 serve as safety rollers along the return run. In the embodiment shown in FIG. 1, the belt is further turned through 180° about its longitudinal axis, after passing over a guide roller parallel to the support rollers 2 and 3, thereby to occupy the position shown in FIG. 1 along the return run. However, the belt 4 may also travel with the strip 10 at the bottom, i.e. applied against the support roller 3 along the return run. Alternatively, the lower run can be used for conveying the material, while the upper run may serve as return run.

Figure 2:
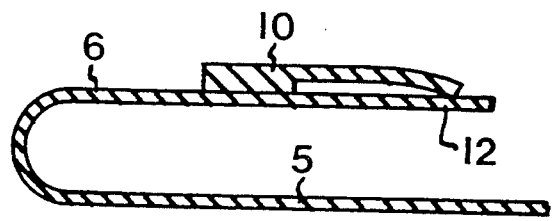
FIG. 2 is a cross-sectional view of a second embodiment of a conveyor belt according to the invention.

FIG. 2 illustrates a detail of a second embodiment of the inventive conveyor belt 4. Here, the outer portion of the strip 10 is pre-formed into a clamping flap, so that the pocket 11 becomes narrower towards its opening. Naturally, this also helps to prevent the free edge portion 13 from turning in the pocket 11.

Figure 3:
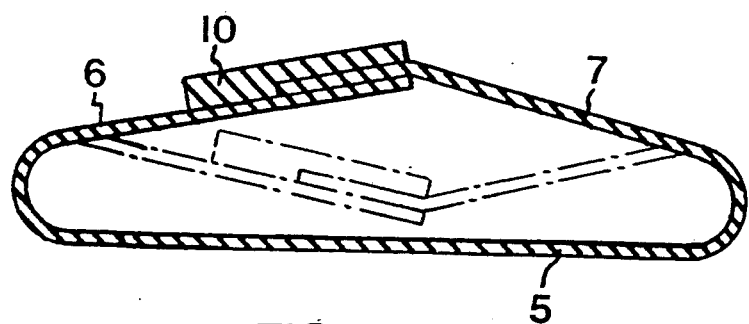
FIG. 3 is a view of a third embodiment of a conveyor belt according to the invention.

Although the edge part 7 preferably is flexurally rigid in its entirety in the transverse direction of the belt 4, the outer portion thereof may alternatively be hingedly connected to the remainder of the edge part 7 outwardly of the pocket 11, as shown in FIG. 3.

To obtain the desired properties of the connection between the edge parts 6 and 7, the depth of the pocket 11 suitably is substantially larger than the width, i.e. the thickness of the free edge portion 13 received therein.

Figure 5:
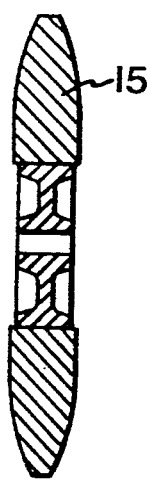
FIG. 5 is a cross-sectional view of a belt-opening disc shown in FIG. 4.
Figure 4:
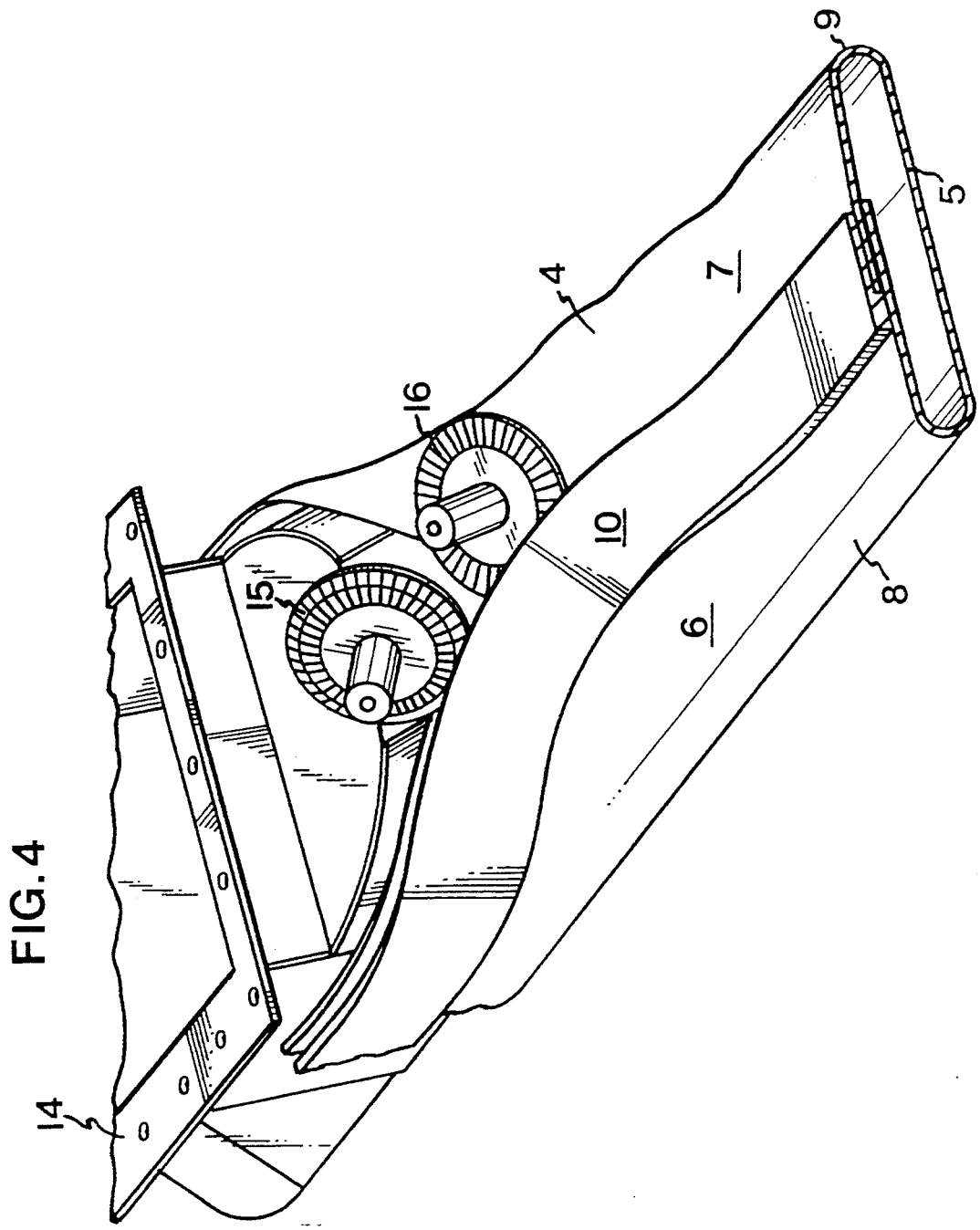
FIG. 4 is a perspective view illustrating the closure or sealing of a conveyor belt according to the invention.

FIG. 4 illustrates the sealing of an inventive conveyor belt 4 in a belt conveyor according to the invention. More precisely, the belt 4 passes a charging bin 14 with the edge parts 6 and 7 folded up from the central part 5, and is to be sealed after the bin. To this end, a rotary disc 15 is mounted in the frame of the belt conveyor in a manner not shown. As illustrated in FIG. 5, the disc 15 tapers towards its periphery in a wedge-like fashion. Further, the disc 15 is positioned so as to engage and widen the pocket 11 to enable the free edge portion 13 of the edge part 7 to be introduced into the pocket 11 once this has been widened. To further facilitate this operation, an additional thin slide disc 16 may, as shown in FIG. 4, be rotatably mounted in the frame (not shown) and project into the pocket 11 between the edge portion 13 and the strip 10 immediately after the disc 15, as seen in the direction of travel of the belt 4. Preferably, the slide disc 16 is made of an elastic material of low friction coefficient and may alternatively be the only disc used for introducing the belt 4 into the pocket 11.

Figure 6:
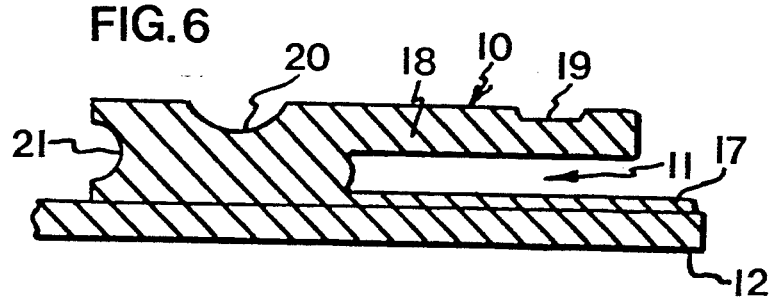
FIG. 6 is a cross-sectional view of a preferred embodiment of a strip used in the conveyor belt according to the invention.

FIG. 6 shows a preferred embodiment of the strip 10, which is U-shaped so that the pocket 11 is formed between the branches 17, 18 of the strip 10. Since the branch 17 is applied against the edge portion 12 with its entire outer surface, the strip 10 can be most firmly fixed against the edge portion 12. When the belt 4 and the strip 10 are made of rubber, fixation is achieved by vulcanisation of the whole contact surface therebetween. On the outside, the branch 18 has a groove 19 making it easier to urge This flap outwards when the free edge portion 13 is introduced into the pocket 11. The strip 10 has additional grooves 20 and 21 serving to engage guide rollers guiding the belt along at least parts of its path, or alternatively serving to improve the joining together of the strip at the joints, in which case the grooves 20 and 21 can be used for positioning joining elements bridging the joint.

It goes without saying that several modifications of the above embodiments are conceivable within the scope of the invention. Thus, the belt may have any optional appearance as long as the edge parts are flexurally rigid in the transverse direction of the belt and the belt exerts a retaining force on the non-rotatable connection between the edge parts. For instance, the strip 10 may be arranged on the inside of the edge part 6. The described reinforcements for creating the indicated flexural rigidities may alternatively be obtained by varying the belt thickness over the belt width. In the case of relatively small belts, the belt may thus be extruded in a single piece of a suitable plastics material, in which case the pocket 11 may be arranged in symmetrical relationship to the edge part 6.

I claim:

1. A conveyor belt of the type surrounding the material conveyed and comprising a planar central part (5) which is flexurally rigid in the transverse direction of the belt, as well as two planar edge parts (6, 7) which are hingedly connected to the central part and are flexurally rigid in the transverse direction of the belt, characterised in that the one planar edge part (6) is divided into two portions closest to its free longitudinal edge so as to form a longitudinal flat pocket (11) which is open towards the free longitudinal edge and whose depth is substantially larger than its width, that the free edge portion (13) of the other planar edge part (7) is received in the pocket so as to be substantially unable to rotate about the longitudinal axis of the belt owing to its thickness being substantially the same as the width of the pocket and owing to the total width of the two planar edge parts (6, 7) being substantially larger than the width of the central part (5), and that the free edge portion (13) of said other planar edge part (7) is forcedly retained in the pocket (11) as a result of the hinge connection between the planar central part (5) and the two planar edge parts (6, 7) which, like the central part, act in the manner of a single, substantially rigid plate.

2. A conveyor belt as set forth in claim 1, characterised in that the width of the pocket (11) is substantially the same over the entire depth of the pocket.

3. A conveyor belt as set forth in claim 1, characterised in that the pocket (11) is expandable at its open side to facilitate the reception of the free edge portion (13) of said other edge part (7).

4. A conveyor belt as set forth in claim 3, characterised in that the width of the pocket (11) decreases towards the open side of the pocket.

5. A conveyor belt as set forth in claim 1, characterised in that the pocket (11) is formed of a U-shaped strip (10) fixedly connected to the free edge portion (12) of said one edge part (6).

6. A conveyor belt as set forth in claim 1, characterised in that the central part (5) has low extensibility in the longitudinal direction of the belt (4), and that the edge parts (6, 7) are extendible in the longitudinal direction of the belt.

7. A conveyor belt as set forth in claim 6, characterised in that two hinge parts (8, 9) are each provided for connecting one edge part (6, 7) and the central part (5), said hinge parts being flexible in the transverse direction of the belt (4), extendible in the longitudinal direction of the belt, and resilient so as to permit pivoting the edge parts outwards away from a position in which they are folded over the central part, and further having a substantially smaller width than the central part.

8. A belt conveyor comprising an endless conveyor belt (4) of the type surrounding the material conveyed and having a planar central part (5) which is flexurally rigid in the transverse direction of the belt, and two planar edge parts (6, 7) which are hingedly connected to the central part and are flexurally rigid in the transverse direction of the belt, as well as a frame (1) having support rollers (2, 3) for carrying the belt along at least part of its path, characterised in that the one planar edge part (6) is divided into two portions closest to its free longitudinal edge so as to form a longitudinal flat pocket (11) which is open towards the free longitudinal edge and whose depth is substantially larger than its width, that the free edge portion (13) of the other planar edge part (7) is received in the pocket so as to be substantially unable to rotate about the longitudinal axis of the belt owing to its thickness being substantially the same as the width of the pocket and owing to the total width of the two planar edge parts being substantially larger than the width of the central part, and that a rotary disc (15; 16) is mounted in the frame (1) for engaging and widening the pocket (11) to permit introducing of the free edge portion (13) of said other edge part (7) therein at a belt sealing location along the belt path.

9. A belt conveyor as set forth in claim 8, characterised in that the slide disc (16) is made of an elastic material of low friction coefficient.

10. A belt conveyor as set forth in claim 9, characterised in that the slide disc (16) is mounted so as to project into the pocket (11) in the direction of travel of the belt (4) after a rotary disc (15) serving to widen the pocket and tapering in the form of a wedge towards its periphery.

11. A belt conveyor as set forth in claim 8, characterised in that it has means for preventing an increase of the width of the belt (4) when this changes its direction of travel.

12. A belt conveyor as set forth in claim 8, characterised in that the free edge portion (13) of said other edge part (7) received in the pocket (11) is hingedly connected to the remainder of this edge part.

* * * * *

UNITED STATES PATENT AND TRADEMARK OFFICE
CERTIFICATE OF CORRECTION

PATENT NO. : 5,400,899
DATED : March 28, 1995
INVENTOR(S) : TINGSKOG L.

It is certified that error appears in the above-indentified patent and that said Letters Patent is hereby corrected as shown below:

Title page, item [22], please change "Oct. 22, 1991" to read --Oct. 22, 1992--.

Signed and Sealed this

Twenty-fifth Day of July, 1995

Attest:

BRUCE LEHMAN

*Attesting Officer*   *Commissioner of Patents and Trademarks*